(12) United States Patent
Hasegawa

(10) Patent No.: US 7,313,645 B2
(45) Date of Patent: Dec. 25, 2007

(54) PROCESSOR TO REDUCE DATA REARRANGEMENT INSTRUCTIONS FOR MATRICES IN MULTIPLE MEMORY BANKS

(75) Inventor: Koichi Hasegawa, Kanagawa (JP)

(73) Assignee: Sony Corporation (JP)

( * ) Notice: Subject to any disclaimer, the term of this patent is extended or adjusted under 35 U.S.C. 154(b) by 181 days.

(21) Appl. No.: 11/100,490

(22) Filed: Apr. 7, 2005

(65) Prior Publication Data

US 2005/0251614 A1    Nov. 10, 2005

(30) Foreign Application Priority Data

Apr. 16, 2004   (JP)   ............................. 2004-121705

(51) Int. Cl.
*G06F 12/00* (2006.01)
(52) U.S. Cl. .......................................... 711/5; 345/644
(58) Field of Classification Search ..................... 711/5
See application file for complete search history.

(56) References Cited

U.S. PATENT DOCUMENTS

| | | | | |
|---|---|---|---|---|
| 5,638,533 | A * | 6/1997 | Law ............................. | 711/157 |
| 5,649,179 | A * | 7/1997 | Steenstra et al. ............ | 712/248 |
| 6,307,553 | B1 * | 10/2001 | Abdallah .................... | 345/419 |
| 6,604,166 | B1 * | 8/2003 | Jana et al. ..................... | 711/5 |
| 2003/0126351 | A1 * | 7/2003 | Park ............................... | 711/5 |
| 2004/0252547 | A1 * | 12/2004 | Wang ........................... | 365/154 |

FOREIGN PATENT DOCUMENTS

| JP | 60-134359 | 7/1985 |
|---|---|---|
| JP | 2002-149400 | 5/2002 |

OTHER PUBLICATIONS

"IA-32 Intel (R) Architecture Software Developer's Manual vol. 1: Basic Architecture," Intel Corporation, 2004.
"AltiVec Technology Programming Interface Manual,," Motorola Inc., Jun. 1999.

* cited by examiner

*Primary Examiner*—Donald Sparks
*Assistant Examiner*—Alan M Otto
(74) *Attorney, Agent, or Firm*—Rader Fishman & Grauer PLLC; Ronald P. Kananen

(57) ABSTRACT

The present invention provides a processor including: a plurality of memory banks; a read-address generation circuit for supplying a read address to each of the memory banks on the basis of a read-register specification and a read-register scan direction; a read control circuit for executing control to rearrange a plurality of pieces of read data, which is read out from the memory banks in accordance with the read addresses, on the basis of the read-register specification and a read-register displacement; and a processing unit for carrying out a plurality of operations on the rearranged pieces of read data output by the read control circuit.

2 Claims, 16 Drawing Sheets

FOR SCAN DIRECTION = 0

FOR SCAN DIRECTION = 1

| | 0 | 1 | 2 | 3 |
|---|---|---|---|---|
| 0 | R[0][0] | R[0][1] | R[0][2] | R[0][3] |
| 1 | R[1][0] | R[1][1] | R[1][2] | R[1][3] |
| 2 | R[2][0] | R[2][1] | R[2][2] | R[2][3] |
| 3 | R[3][0] | R[3][1] | R[3][2] | R[3][3] |
| 4 | R[4][0] | R[4][1] | R[4][2] | R[4][3] |
| 5 | R[5][0] | R[5][1] | R[5][2] | R[5][3] |
| 6 | R[6][0] | R[6][1] | R[6][2] | R[6][3] |
| 7 | R[7][0] | R[7][1] | R[7][2] | R[7][3] |
| 8 | R[8][0] | R[8][1] | R[8][2] | R[8][3] |
| 9 | R[9][0] | R[9][1] | R[9][2] | R[9][3] |
| 10 | R[10][0] | R[10][1] | R[10][2] | R[10][3] |
| 11 | R[11][0] | R[11][1] | R[11][2] | R[11][3] |
| 12 | R[12][0] | R[12][1] | R[12][2] | R[12][3] |
| 13 | R[13][0] | R[13][1] | R[13][2] | R[13][3] |
| 14 | R[14][0] | R[14][1] | R[14][2] | R[14][3] |
| 15 | R[15][0] | R[15][1] | R[15][2] | R[15][3] |

|   | 0 | 1 | 2 | 3 | |
|---|---|---|---|---|---|
| 0 | A[0][0] | A[0][1] | A[0][2] | A[0][3] | A |
| 1 | A[1][0] | A[1][1] | A[1][2] | A[1][3] | |
| 2 | A[2][0] | A[2][1] | A[2][2] | A[2][3] | |
| 3 | A[3][0] | A[3][1] | A[3][2] | A[3][3] | |
| 4 | B[0][0] | B[0][1] | B[0][2] | B[0][3] | B |
| 5 | B[1][0] | B[1][1] | B[1][2] | B[1][3] | |
| 6 | B[2][0] | B[2][1] | B[2][2] | B[2][3] | |
| 7 | B[3][0] | B[3][1] | B[3][2] | B[3][3] | |
| 8 | D[0][0] | D[0][1] | D[0][2] | D[0][3] | C |
| 9 | D[1][0] | D[1][1] | D[1][2] | D[1][3] | |
| 10 | D[2][0] | D[2][1] | D[2][2] | D[2][3] | |
| 11 | D[3][0] | D[3][1] | D[3][2] | D[3][3] | |
| 12 | R[12][0] | R[12][1] | R[12][2] | R[12][3] | WORK AREA |
| 13 | R[13][0] | R[13][1] | R[13][2] | R[13][3] | |
| 14 | R[14][0] | R[14][1] | R[14][2] | R[14][3] | |
| 15 | R[15][0] | R[15][1] | R[15][2] | R[15][3] | |

FIG. 8

|   | #0 310 | #1 311 | #2 312 | #3 313 |
|---|---|---|---|---|
| 0 | R[0][0] | R[0][1] | R[0][2] | R[0][3] |
| 1 | R[1][3] | R[1][0] | R[1][1] | R[1][2] |
| 2 | R[2][2] | R[2][3] | R[2][0] | R[2][1] |
| 3 | R[3][1] | R[3][2] | R[3][3] | R[3][0] |
| 4 | R[4][0] | R[4][1] | R[4][2] | R[4][3] |
| 5 | R[5][3] | R[5][0] | R[5][1] | R[5][2] |
| 6 | R[6][2] | R[6][3] | R[6][0] | R[6][1] |
| 7 | R[7][1] | R[7][2] | R[7][3] | R[7][0] |
| 8 | R[8][0] | R[8][1] | R[8][2] | R[8][3] |
| 9 | R[9][3] | R[9][0] | R[9][1] | R[9][2] |
| 10 | R[10][2] | R[10][3] | R[10][0] | R[10][1] |
| 11 | R[11][1] | R[11][2] | R[11][3] | R[11][0] |
| 12 | R[12][0] | R[12][1] | R[12][2] | R[12][3] |
| 13 | R[13][3] | R[13][0] | R[13][1] | R[13][2] |
| 14 | R[14][2] | R[14][3] | R[14][0] | R[14][1] |
| 15 | R[15][1] | R[15][2] | R[15][3] | R[15][0] |

FIG. 1 0 B

| ELEMENT COUNT 1224 | 351 OUTPUT |
|---|---|
| 0 | 0001 |
| 1 | 0011 |
| 2 | 0111 |
| 3 | 1111 |

FIG.11

| WRITE-REGISTER SELECT SIGNAL 3531 | WRITE DATA | | | |
|---|---|---|---|---|
| | 3593 | 3592 | 3591 | 3590 |
| 0 | 1493 | 1492 | 1491 | 1490 |
| 1 | 1492 | 1491 | 1490 | 1493 |
| 2 | 1491 | 1490 | 1493 | 1492 |
| 3 | 1490 | 1493 | 1492 | 1491 |

FIG.14

| READ-REGISTER SELECT SIGNAL 3621 | READ DATA | | | |
|---|---|---|---|---|
| | 3693 | 3692 | 3691 | 3690 |
| 0 | 3131 | 3121 | 3111 | 3101 |
| 1 | 3101 | 3131 | 3121 | 3111 |
| 2 | 3111 | 3101 | 3131 | 3121 |
| 3 | 3121 | 3111 | 3101 | 3131 |

PROCESSOR TO REDUCE DATA REARRANGEMENT INSTRUCTIONS FOR MATRICES IN MULTIPLE MEMORY BANKS

BACKGROUND OF THE INVENTION

The present invention relates to a processor of an SIMD (Single Instruction Multiple Data) type and, more particularly, relates to an SIMD processor that allows accesses to matrix data to be made with a high degree of flexibility.

When processing of two-dimensional pictures or matrix processing of three-dimensional graphics is to be carried out by using an SIMD processor, it is necessary to rearrange pieces of data in advance so as to make the pieces of data match the processing format of a processing instruction provided for the processor. For example, data arrangement instructions are included in an instruction set called SSE (Streaming SIMD Extensions) and an instruction set called AltiVec. The SSE instruction set has been developed by Intel Corporation, as an instruction set oriented for multimedia applications. On the other hand, the Altivec instruction has been developed by Motorola Inc., also for the same applications. In these SSE and Altivec instruction sets, a variety of data arrangement instructions is defined as respectively disclosed in documents:

"IA-32 Intel(R) Architecture Software Developer's Manual Volume 1: Basic Architecture," Intel Corporation, 2004; and "AltiVec Technology Programming Interface Manual," Motorola Inc., June 1999.

Assume for example that a 4-row 4-column matrix A and a 4-row 4-column matrix B are subjected to inner-product processing and the result of the inner-product processing is put in a 4-row 4-column matrix D. In this case, computations carried out in the inner-product processing are each a computation to find a sum of products as follows:

$D$ [0] [0]=$A$ [0] [0]×$B$ [0] [0]+$A$ [0] [1]×$B$ [1] [0]+
$A$ [0] [2]×$B$ [2] [0]+$A$ [0] [3]×$B$ [3] [0]

$D$ [0] [1]=$A$ [0] [0]×$B$ [0] [1]+$A$ [0] [1]×$B$ [1] [1]+
$A$ [0] [2]×$B$ [2] [1]+$A$ [0] [3]×$B$ [3] [1]

$D$ [0] [2]=$A$ [0] [0]×$B$ [0] [2]+$A$ [0] [1]×$B$ [1] [2]+
$A$ [0] [2]×$B$ [2] [2]+$A$ [0] [3]×$B$ [3] [2]

$D$ [0] [3]=$A$ [0] [0]×$B$ [0] [3]+$A$ [0] [1]×$B$ [1] [3]+
$A$ [0] [2]×$B$ [2] [3]+$A$ [0] [3]×$B$ [3] [3]

$D$ [1] [0]=$A$ [1] [0]×$B$ [0] [0]+$A$ [1] [1]×$B$ [1] [0]+
$A$ [1] [2]×$B$ [2] [0]+$A$ [1] [3]×$B$ [3] [0]

$D$ [1] [1]=$A$ [1] [0]×$B$ [0] [1]+$A$ [1] [1]×$B$ [1] [1]+
$A$ [1] [2]×$B$ [2] [1]+$A$ [1] [3]×$B$ [3] [1]

$D$ [1] [2]=$A$ [1] [0]×$B$ [0] [2]+$A$ [1] [1]×$B$ [1] [2]+
$A$ [1] [2]×$B$ [2] [2]+$A$ [1] [3]×$B$ [3] [2]

$D$ [1] [3]=$A$ [1] [0]×$B$ [0] [3]+$A$ [1] [1]×$B$ [1] [3]+
$A$ [1] [2]×$B$ [2] [3]+$A$ [1] [3]×$B$ [3] [3]

$D$ [2] [0]=$A$ [2] [0]×$B$ [0] [0]+$A$ [2] [1]×$B$ [1] [0]+
$A$ [2] [2]×$B$ [2] [0]+$A$ [2] [3]×$B$ [3] [0]

$D$ [2] [1]=$A$ [2] [0]×$B$ [0] [1]+$A$ [2] [1]×$B$ [1] [1]+
$A$ [2] [2]×$B$ [2] [1]+$A$ [2] [3]×$B$ [3] [1]

$D$ [2] [2]=$A$ [2] [0]×$B$ [0] [2]+$A$ [2] [1]×$B$ [1] [2]+
$A$ [2] [2]×$B$ [2] [2]+$A$ [2] [3]×$B$ [3] [2]

$D$ [2] [3]=$A$ [2] [0]×$B$ [0] [3]+$A$ [2] [1]×$B$ [1] [3]+
$A$ [2] [2]×$B$ [2] [3]+$A$ [2] [3]×$B$ [3] [3]

$D$ [3] [0]=$A$ [3] [0]×$B$ [0] [0]+$A$ [3] [1]×$B$ [1] [0]+
$A$ [3] [2]×$B$ [2] [0]+$A$ [3] [3]×$B$ [3] [0]

$D$ [3] [1]=$A$ [3] [0]×$B$ [0] [1]+$A$ [3] [1]×$B$ [1] [1]+
$A$ [3] [2]×$B$ [2] [1]+$A$ [3] [3]×$B$ [3] [1]

$D$ [3] [2]=$A$ [3] [0]×$B$ [0] [2]+$A$ [3] [1]×$B$ [1] [2]+
$A$ [3] [2]×$B$ [2] [2]+$A$ [3] [3]×$B$ [3] [2]

$D$ [3] [3]=$A$ [3] [0]×$B$ [0] [3]+$A$ [3] [1]×$B$ [1] [3]+
$A$ [3] [2]×$B$ [2] [3]+$A$ [3] [3]×$B$ [3] [3]

In order to find every sum of products described above, data-arrangement and operation instructions are defined as follows. In the first place, a data arrangement instruction named MERGEH with a format of 'MERGEH d, a, b' is defined as an instruction for carrying out the following operations:

R [d] [0]=R [b] [2]

R [d] [1]=R [a] [2]

R [d] [2]=R [b] [3]

R [d] [3]=R [a] [3]

In the second place, a data arrangement instruction named MERGEL with a format of 'MERGEL d, a, b' is defined as an instruction for carrying out the following operations:

R [d] [0]=R [b] [0]

R [d] [1]=R [a] [0]

R [d] [2]=R [b] [1]

R [d] [3]=R [a] [1]

In the third place, an operation instruction named DOT with a format of 'DOT d, a, b' is defined as an instruction for carrying out the following operations:

$R$ [d] [0]=$R$ [a] [0]×$R$ [b] [0]+$R$ [a] [1]×$R$ [b]
[1]+$R$ [a] [2]×$R$ [b] [2]+$R$ [a] [3]×$R$ [b] [3]

In the above instructions, symbol R is a register file having 16 rows and 4 columns. Then, a matrix A is defined as a matrix having the following values:

R [0] [0], R [0] [1], R [0] [2], R [0] [3],

R [1] [0], R [1] [1], R [1] [2], R [1] [3],

R [2] [0], R [2] [1], R [2] [2], R [2] [3],

R [3] [0], R [3] [1], R [3] [2], R [3] [3]

By the same token, a matrix B is defined as a matrix having the following values:

R [4] [0], R [4] [1], R [4] [2], R [4] [3],

R [5] [0], R [5] [1], R [5] [2], R [5] [3],

R [6] [0], R [6] [1], R [6] [2], R [6] [3],

R [7] [0], R [7] [1], R [7] [2], R [7] [3]

In the same way, a matrix D is defined as a matrix having the following values:

R [8] [0], R [8] [1], R [8] [2], R [8] [3],

R [9] [0], R [9] [1], R [9] [2], R [9] [3],

R [10] [0], R [10] [1], R [10] [2], R [10] [3],

R [11] [0], R [11] [1], R [11] [2], R [11] [3]

With the register file R as well as the matrices A, B and D so defined, a program for finding the inner product of the 4-row and 4-column matrices A and B is expressed by the following sequence of instructions:

MERGEH 12, 0, 2
MERGEH 13, 1, 3
MERGEL 14, 0, 2
MERGEL 15, 1, 3
MERGEH 0, 12, 13
MERGEL 1, 12, 13
MERGEH 2, 14, 15
MERGEL 3, 14, 15
DOT 12, 0, 4
DOT 13, 0, 5
DOT 14, 0, 6
DOT 15, 0, 7
MERGEL 12, 12, 13
MERGEL 14, 14, 15
MERGEL 8, 12, 14
DOT 12, 1, 4
DOT 13, 1, 5
DOT 14, 1, 6
DOT 15, 1, 7
MERGEL 12, 12, 13
MERGEL 14, 14, 15
MERGEL 9, 12, 14
DOT 12, 2, 4
DOT 13, 2, 5
DOT 14, 2, 6
DOT 15, 2, 7
MERGEL 12, 12, 13
MERGEL 14, 14, 15
MERGEL 10, 12, 14
DOT 12, 3, 4
DOT 13, 3, 5
DOT 14, 3, 6
DOT 15, 3, 7
MERGEL 12, 12, 13
MERGEL 14, 14, 15
MERGEL 11, 12, 14

Thus, it is obvious from the above typical program that, in an application where data transfer instructions (or data arrangement instructions) are to be executed prior to executions of operation instructions in accordance with the related-art technology, for example, 36 instructions need to be executed in order to compute the inner product of 4-row 4-column matrices.

SUMMARY OF THE INVENTION

In accordance with the related-art technology described above, data arrangement instructions may need to be executed prior to executions of operation instructions. Since a data arrangement instruction is executed to carry out virtually no processing, however, an execution of a data arrangement instruction reduces the processing efficiency substantially.

In order to solve the above problem, inventors of the present invention have developed an SIMD processor that requires no data arrangement instruction preceding an operation instruction so as to increase the processing efficiency.

In order to solve the above problem, in accordance with an embodiment of the present invention, there is provided a processor including: a plurality of memory banks; a read-address generation circuit for supplying a read address to each of the memory banks on the basis of a read-register specification and a read-register scan direction; a read control circuit for executing control to rearrange a plurality of pieces of read data, which is read out from the memory banks in accordance with the read addresses, on the basis of the read-register specification and a read-register displacement; and a processing unit for carrying out a plurality of operations on the rearranged pieces of read data output by the read control circuit.

This processor thus brings about an effect of executing control to rearrange the pieces of data read out from the memory banks before supplying the data to the processing unit.

In addition, in accordance with an embodiment of the present invention, in the processor described above, the read-register scan direction is implemented by supplying the memory banks with a constant read address or a read address varying at predetermined intervals. Thus, the processor brings about an effect that pieces of data can be read out from the memory banks while scanning the pieces of data in a desired scan direction.

In addition, in accordance with an embodiment of the present invention, in the processor described above, the processing unit computes a sum of products in the operations. Thus, the processor brings about an effect that it is possible to compute an inner product for matrix data stored in the memory banks.

In addition, in accordance with an embodiment of the present invention, there is provided a processor including: a plurality of memory banks; a write-address generation circuit for supplying a write address to each of the memory banks on the basis of a write-register specification and a write-register scan direction; a processing unit for carrying out a plurality of operations on a plurality of pieces of data and outputting a plurality of pieces of write data as a result of the operations; and a write control circuit for executing control to rearrange the pieces of write data output by the processing unit on the basis of the write-register specification, a write-register displacement and the number of write-register elements and supplying the rearranged pieces of write data to the memory banks.

This processor thus brings about an effect of executing control to rearrange the pieces of write data output by the processing unit before supplying the data to the memory banks.

In addition, in accordance with an embodiment of the present invention, in the processor described above, the write-register scan direction is implemented by supplying the memory banks with a constant write address or a write address varying at predetermined intervals. Thus, the processor brings about an effect that pieces of data can be written into the memory banks while scanning the pieces of data in a desired scan direction.

In addition, in accordance with an embodiment of the present invention, in the processor described above, the processing unit computes a sum of products in the operations. Thus, the processor brings about an effect that it is possible to compute an inner product for matrix data stored in the memory banks.

In addition, in accordance with an embodiment of the present invention, there is provided a processor including: a plurality of memory banks; a read-address generation circuit for supplying a read address to each of the memory banks on the basis of a read-register specification and a read-register scan direction; a read control circuit for executing control to rearrange a plurality of pieces of read data, which is read out from the memory banks in accordance with the read addresses, on the basis of the read-register specification and a read-register displacement; a processing unit for carrying out a plurality of operations on the rearranged pieces of read data output by the read control circuit and outputting a plurality of pieces of write data as a result of the operations; a write-address generation circuit for supplying a write address to each of the memory banks on the basis of a write-register specification and a write-register scan direction; and a write control circuit for executing control to rearrange the pieces of write data output by the processing unit on the basis of the write-register specification, a write-register displacement and the number of write-register elements and supplying the rearranged pieces of write data to the memory banks.

This processor thus brings about an effect of executing control to rearrange the pieces of data read out from the memory banks before supplying the data to the processing unit and an effect of executing control to rearrange the pieces of write data output by the processing unit before supplying the data to the memory banks.

In addition, in accordance with an embodiment of the present invention, in the processor described above, the read-register scan direction is implemented by supplying the memory banks with a constant read address or a read address varying at predetermined intervals and the write-register scan direction is implemented by supplying the memory banks with a constant write address or a write address varying at predetermined intervals. Thus, the processor brings about an effect that pieces of data can be read out from the memory banks while scanning the pieces of data in a desired scan direction and an effect that pieces of data can be written into the memory banks while scanning the pieces of data in a desired scan direction.

In addition, in accordance with an embodiment of the present invention, in the processor described above, the processing unit computes a sum of products in the operations. Thus, the processor brings about an effect that it is possible to compute an inner product for matrix data stored in the memory banks.

In addition, in accordance with an embodiment of the present invention, there is provided a processor including: an instruction decoder for decoding an instruction included in a program; a plurality of memory banks; a read-address generation circuit for supplying a read address to each of the memory banks on the basis of instruction-decoding results generated by the instruction decoder as results including a read-register specification and a read-register scan direction; a read control circuit for executing control to rearrange a plurality of pieces of read data, which is read out from the memory banks in accordance with the read addresses, on the basis of instruction-decoding results generated by the instruction decoder as results including the read-register specification and a read-register displacement; a processing unit for carrying out a plurality of operations on the rearranged pieces of read data output by the read control circuit and outputting a plurality of pieces of write data as a result of the operations; a write-address generation circuit for supplying a write address to each of the memory banks on the basis of instruction-decoding results generated by the instruction decoder as results including a write-register specification and a write-register scan direction; and a write control circuit for executing control to rearrange the pieces of write data output by the processing unit on the basis of instruction-decoding results generated by the instruction decoder as results including the write-register specification, a write-register displacement and the number of write-register elements and supplying the rearranged pieces of write data to the memory banks.

This processor thus brings about an effect of executing control to rearrange the pieces of data read out from the memory banks before supplying the data to the processing unit and an effect of executing control to rearrange the pieces of write data output by the processing unit before supplying the data to the memory banks on the basis of instruction-decoding results output by the instruction decoder.

The present invention exhibits an excellent effect that an SIMD processor needs no data arrangement instruction preceding an operation instruction so as to increase the processing efficiency.

BRIEF DESCRIPTION OF THE DRAWINGS

FIG. 6 is a diagram showing a typical logical configuration of a register file according to an embodiment of the present invention;

FIG. 7 is a diagram showing typical assignment of the register file to matrices in accordance with an embodiment of the present invention;

FIG. 8 is a diagram showing typical allocation of physical memory banks to the register file according to an embodiment of the present invention;

FIGS. 10A and 10B are diagrams showing a typical configuration of a write control circuit according to an embodiment of the present invention;

FIG. 11 is a diagram showing typical relations set by write-data assigners employed in the write control circuit according to an embodiment of the present invention as relations between write data obtained as a result of operations and data to be actually stored in memory banks;

FIG. 14 is a diagram showing typical relations set by first-read-data assigners employed in the first read control circuit according to an embodiment of the present invention as relations between first data actually read out from memory banks and first read data used as an operand.

DETAILED DESCRIPTION OF THE PREFERRED EMBODIMENTS

Embodiments of the present invention are described by referring to diagrams as follows.

Figure 1:
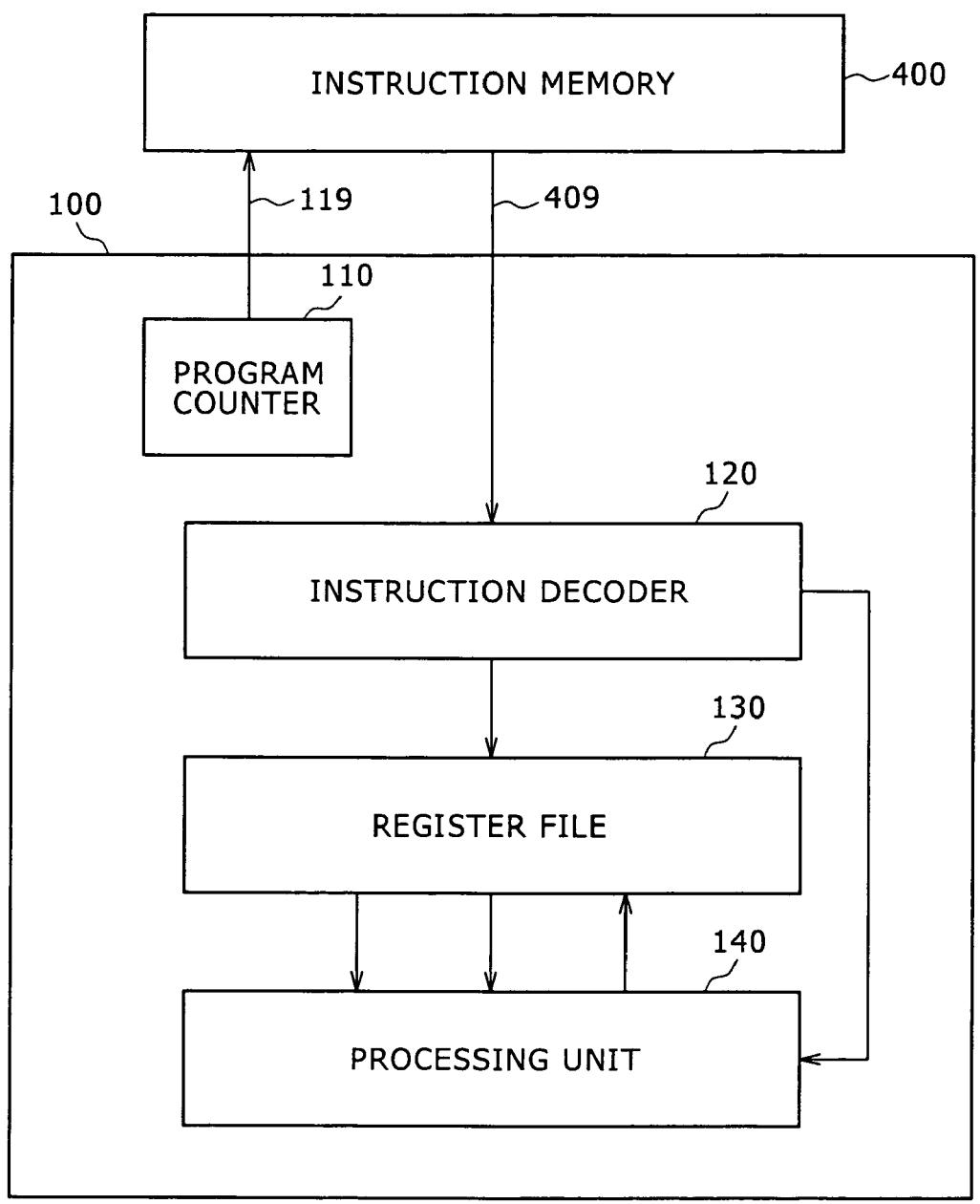
FIG. 1 is a diagram showing a typical configuration of an SIMD processor according to an embodiment of the present invention.

FIG. 1 is a diagram showing a typical configuration of an SIMD processor 100 according to an embodiment of the present invention. The SIMD processor 100 has a program counter 110, an instruction decoder 120, a register file 130 and a processing unit 140. The SIMD processor 100 is connected to an instruction memory 400 or includes the instruction memory 400 as an embedded memory. The instruction memory 400 is a memory used for storing a set of instructions for a RISC (Reduced Instruction Set Computer) architecture. A typical instruction for the RISC architecture has a length of 32 bits and 3 operands. The SIMD processor 100 is an SIMD processor capable of executing typically 4 instructions concurrently. It is to be noted that, while the typical processor is capable of executing for example 4 instructions concurrently, the SIMD processor is by no means limited to the one taken as an example in this case. That is to say, an SIMD may be capable of executing any number of instructions at the same time.

The program counter 110 is a counter for computing a read address at which an instruction is stored in the instruction memory 400. An instruction 409 is read out off the instruction memory 400 from an address 119 indicated by the program counter 110 and supplied to the instruction decoder 120. The instruction decoder 120 decodes the instruction 409 read out from the instruction memory 400 to interpret the operation code of the instruction 409 and operands needed by the instruction 409. A register is selected from the register file 130 in dependence on the result of the interpretation of one of the operands and accessed in operations to write data into the register file 130 or read out data from the register file 130 in accordance with the interpreted operation code. The processing unit 140 then carries out predetermined processing on data, which is read out from the register file 130 as operands, in accordance with the interpreted operation code. A result of the processing carried out by the processing unit 140 is stored in a register, which is also selected from the register file 130 in dependence on the result of the interpretation of one of the operands.

Figure 2:
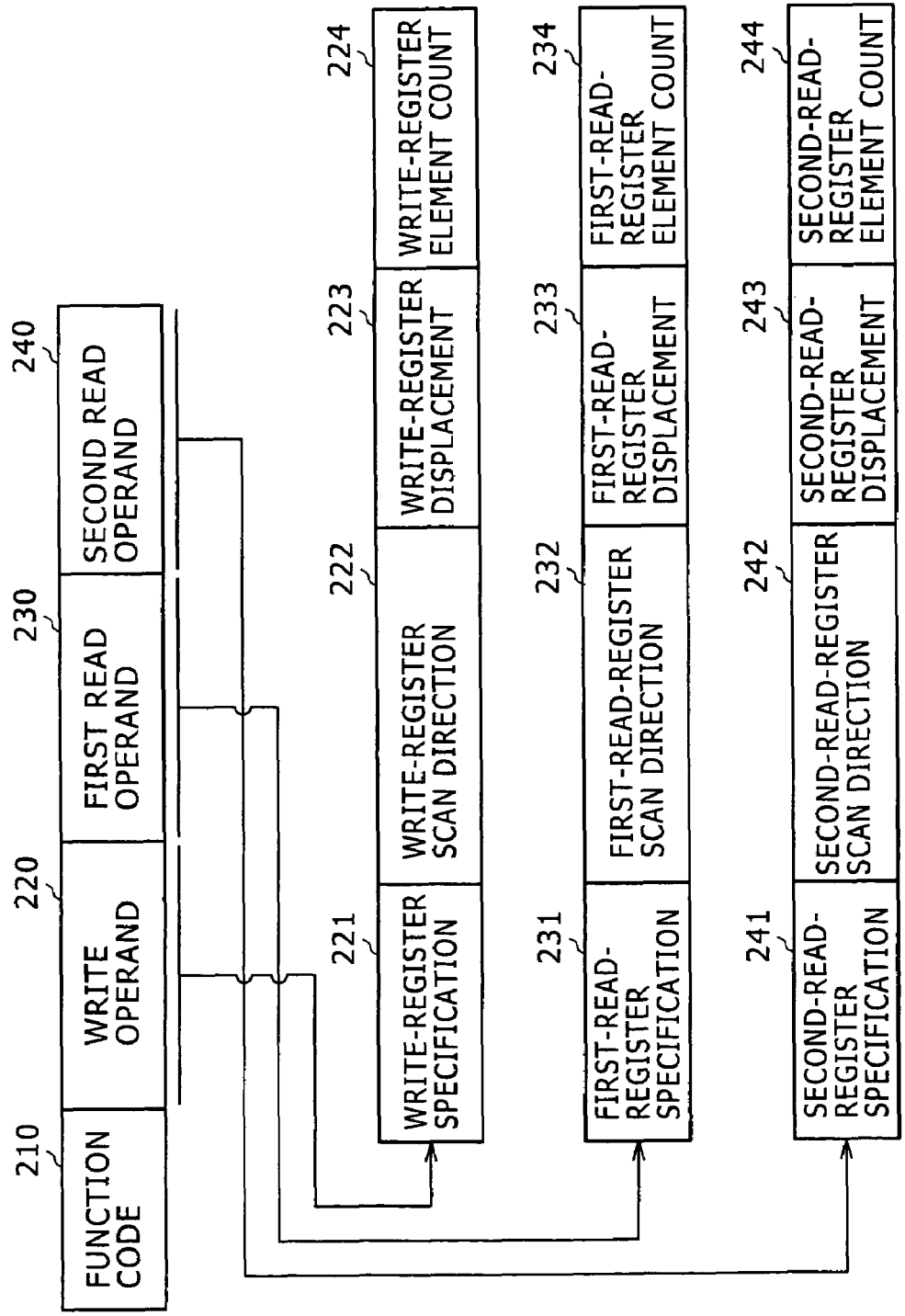
FIG. 2 is a diagram showing a typical instruction format according to an embodiment of the present invention.

FIG. 2 is a diagram showing a typical instruction format according to an embodiment of the present invention. In accordance with this instruction format, an instruction has fields including a function code 210, a write operand 220, a first read operand 230 and a second read operand 240. The function code 210 is a field for defining the aforementioned operation code, which shows an operation to be carried out by the processing unit 140 by execution of the instruction. Typically, the function code 210 defines an operation pertaining to an arithmetic category or another category. An example of the operation pertaining to the arithmetic category is the addition.

The write operand 220 has fields including a write-register specification 221, a write-register scan direction 222, a write-register displacement 223 and a write-register element count 224. The write-register specification 221 is a field for defining the address of a write register. The write-register scan direction 222 is a field for defining a direction of an operation to store data into write registers. The direction in an operation to store data into write registers can be the vertical or horizontal direction of the matrix of the registers. The write-register displacement 223 is a field defining a displacement in an operation to store data into write registers in the horizontal direction. The write-register element count 224 is a field for defining the number of elements to be written into write registers in an operation to store data into the registers.

The first read operand 230 has fields including a first-read-register specification 231, a first-read-register scan direction 232, a first-read-register displacement 233 and a first-read-register element count 234. The first-read-register specification 231 is a field for defining the address of a first read register. The first-read-register scan direction 232 is a field for defining a direction of an operation to fetch data from first read registers. The direction in an operation to fetch data from first registers can be the vertical or horizontal direction of the matrix of the registers. The first-read-register displacement 233 is a field defining a displacement in an operation to fetch data from first read registers in the horizontal direction. The first-read-register element count 234 is a field for defining the number of elements to be fetched from the first read registers in an operation to fetch data from the registers.

The second read operand 240 has fields including a second-read-register specification 241, a second-read-register scan direction 242, a second-read-register displacement 243 and a second-read-register element count 244. The second-read-register specification 241 is a field for defining the address of a second read register. The second-read-register scan direction 242 is a field for defining a direction of an operation to fetch data from second read registers. The direction in an operation to fetch data from second registers can be the vertical or horizontal direction of the matrix of the registers. The second-read-register displacement 243 is a field defining a displacement in an operation to fetch data from second read registers in the horizontal direction. The second-read-register element count 244 is a field for defining the number of elements to be fetched from the second read registers in an operation to fetch data from the registers.

Figure 3:
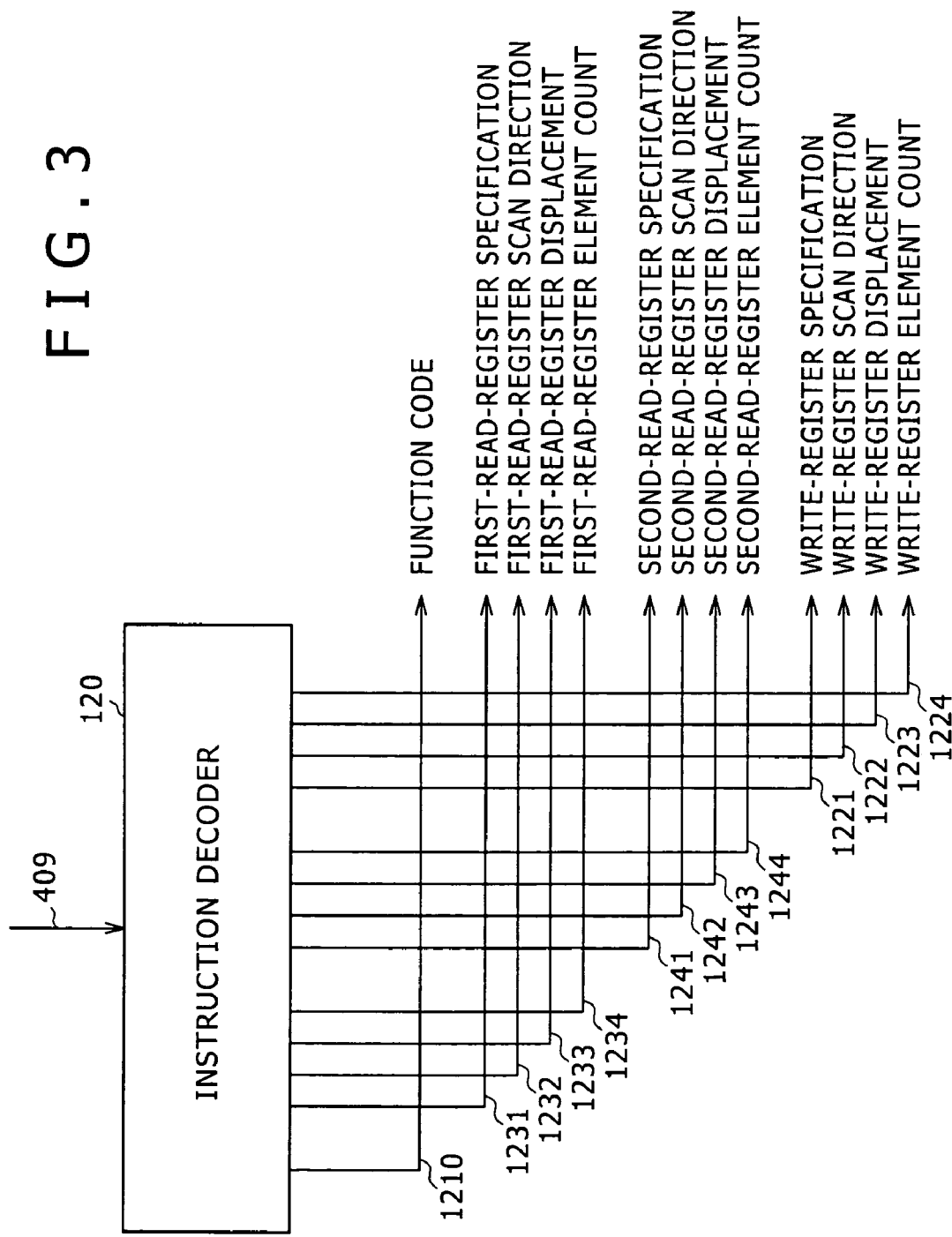
FIG. 3 is a diagram showing typical decoding results produced by an instruction decoder according to an embodiment of the present invention.

FIG. 3 is a diagram showing a typical result of a process carried out by the instruction decoder 120 according to an embodiment of the present invention to decode an instruction 409. The instruction decoder 120 decodes the instruction 409 fetched from the instruction memory 400 to interpret the fields cited above. In the figure, reference numeral 1210 denotes a result of decoding the function code 210.

Reference numerals 1231, 1232, 1233 and 1234 denote results of decoding the first-read-register specification 231, the first-read-register scan direction 232, the first-read-register displacement 233 and the first-read-register element count 234 respectively.

By the same token, reference numerals 1241, 1242, 1243 and 1244 denote results of decoding the second-read-register specification 241, the second-read-register scan direction 242, the second-read-register displacement 243 and the second-read-register element count 244 respectively. In the same way, reference numerals 1221, 1222, 1223 and 1224 denote results of decoding the write-register specification 221, the write-register scan direction 222, the write-register displacement 223 and the write-register element count 224 respectively.

Figure 4:
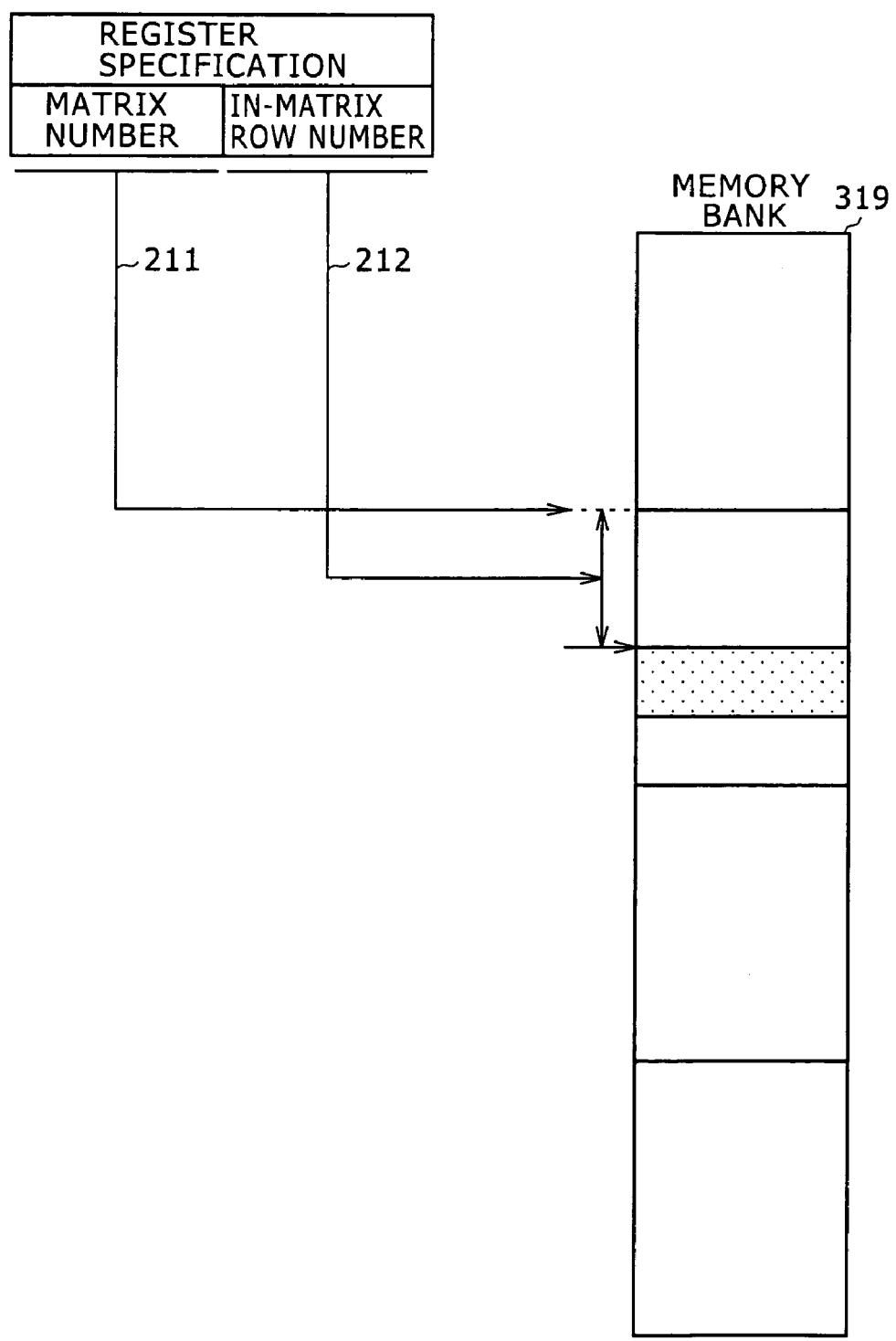
FIG. 4 is a diagram showing a typical register specification according to an embodiment of the present invention.

FIG. 4 is diagram showing a typical register specification according to an embodiment of the present invention. It is assumed here that a register file to be accessed is divided into memory banks to be described later. A register specification includes higher-order bits and lower-order bits. The higher-order bits specify the number of a matrix whereas the lower-order bits specify the number of a row in the matrix.

For 4 matrices each having 4 rows, for example, the register specification needs at least 4 bits. The 2 higher-order bits specify a matrix number 211 whereas the 2 lower-order bits specify an in-matrix row number 212. The matrix number 211 and the in-matrix row number 212 identify a register, which is a row in a memory bank 319.

As described before, the instruction format includes 3 fields of register specification, i.e., the write-register specification 221, the first-read-register specification 231 and the second-read-register specification 241.

Figure 5A:
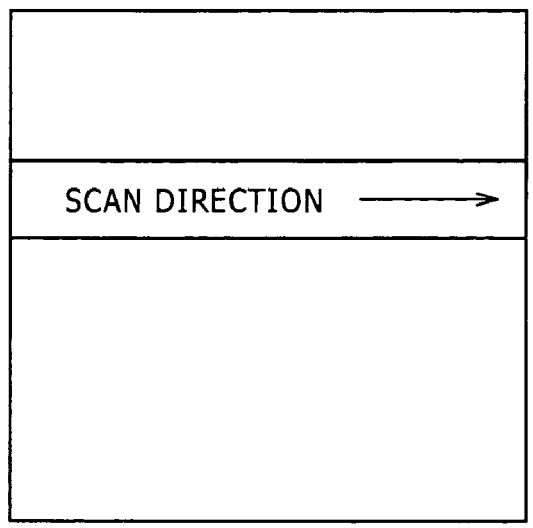
FIGS. 5A and 5B are diagrams showing register scan directions according to an embodiment of the present invention.
Figure 5B:
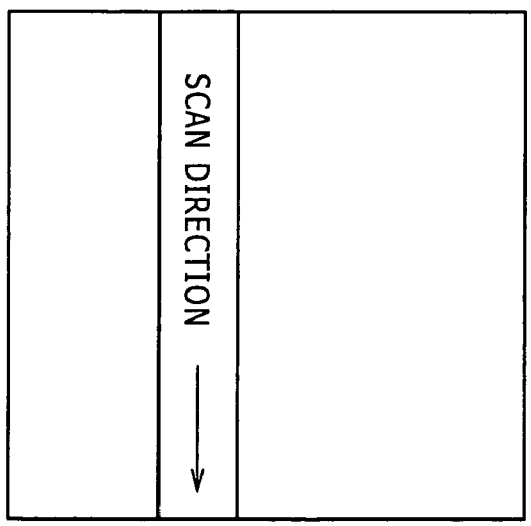

FIGS. 5A and 5B are diagrams showing scan directions according to an embodiment of the present invention. A scan-direction field of 0 indicates that operations each making an access to the matrix are to be carried out in the horizontal direction as shown in FIG. 5A. In the case of a scan-direction field set at 0 for matrix A [i] [j], for example, operations each making an access to the matrix are carried out by fixing the i index but varying the j index.

On the other hand, a scan-direction field of 1 indicates that operations each making an access to the matrix are to be carried out in the vertical direction as shown in FIG. 5B. In the case of a scan-direction field set at 1 for matrix A [i] [j], for example, operations each making an access to the matrix are carried out by fixing the j index but varying the i index.

As described before, the instruction format includes 3 fields of register specification, i.e., the write-register scan direction 222, the first-read-register scan direction 232 and the second-read-register scan direction 242.

A displacement specified in the write-register displacement 223, the first-read-register displacement 233 or the second-read-register displacement 243 is a displacement in the horizontal direction of the matrix shown in FIGS. 5A and 5B for first read registers, second read registers and write registers respectively. A displacement is defined as a shift between the start of a read or write operation and the start of the next read or write operation.

An element count specified in the write-register element count 224 is the number of pieces of data, which are to be written into write registers in one access. On the other hand, an element count specified in the first-read-register element count 234 or the second-read-register element count 244 is the number of pieces of data, which are to be read out from first read registers or second read registers in one access. For example, an access can be made at the same time to n elements arranged in the horizontal or vertical direction in an n-row n-column matrix. If the maximum number of elements that can be accessed at the same time is 4, for example, the element count can be specified in the write-register element count 224, the first-read-register element count 234 or the second-read-register element count 244 by using 2 bits. To put it concretely, an element count of 1 is specified by a value of 0 expressed by 00b in the binary format and an element count of 2 is specified by a value of 1 expressed by 01b in the binary format. By the same token, an element count of 3 is specified by a value of 2 expressed by 10b in the binary format and an element count of 4 is specified by a value of 3 expressed by 11b in the binary format.

FIG. 6 is a diagram showing a typical logical configuration of the register file 130 according to an embodiment of the present invention. Addresses are assigned to the register file 130 by assuming that the register file 130 typically has the configuration of a 16-row 4-column matrix. Thus, the register file 130 can be used for storing 64 pieces of 32-bit data as matrix elements R [0] [0] to R [15] [3].

FIG. 7 is a diagram showing the aforementioned matrices A, B and D as parts of the register file 130. As shown in FIG. 7, the matrices A, B and D each having 4 rows and 4 columns are defined as parts of the register file 130, which is shown in FIG. 6, sequentially from the top of the register file 130. That is to say, elements R [0] [0] to R [3] [3] of the register file 130 are allocated to the matrix A, elements R [4] [0] to R [7] [3] of the register file 130 are allocated to the matrix B and elements R [8] [0] to R [11] [3] of the register file 130 are allocated to the matrix D.

It is to be noted that, since elements R [12] [0] to R [15] [3] of the register file 130 are not assigned to any specific matrix, these 16 elements can be used as a work area if necessary.

FIG. 8 is a diagram showing typical physical division of the register file 130 according to the embodiment of the present invention. As shown in the figure, the register file 130 is physically divided into a plurality of memory banks. Since accesses can be made to the memory banks at the same time, an access to the logical configuration shown in FIG. 6 can be implemented as simultaneous accesses to a number of registers included in the register file 130. In the example shown in FIG. 8, the register file 130 is divided into memory banks 310 to 313. To state it in general terms, a register file usable for storing m n×n matrices, where m and n are each an integer, is divided into n memory banks each usable for storing n×m elements.

Unlike the order shown in FIG. 6, pieces of data assigned to the memory banks are deliberately put in a state of applying the so-called skew to each row. For example, pieces of data on row 0 in the first, second, third and fourth memory banks are respectively R [0] [0], R [0] [1], R [0] [2] and R [0] [3], which are the same as the elements on row 0 shown in FIG. 6. On the other hand, pieces of data on row 1 in the first, second, third and fourth memory banks are respectively R [1] [3], R [1] [0], R [1] [1] and R [1] [2], which are each shifted to the right by 1 column from their respective counterparts on row 0.

By deliberately storing pieces of data in the memory banks as described above, in an operation to make an access to a matrix in the horizontal or vertical direction, the access can be made simultaneously in either of the directions. Take an access to the matrix A shown in FIG. 7 as an example. In this case, in a simultaneous access in either of the directions, pieces of data stored in different memory banks are accessed at the same time. To put it concretely, a typical simultaneous access can be made at the same time in the logically horizontal direction to, for example, R [0] [0], R [0] [1], R [0] [2] and R [0] [3] because they are stored in the first to fourth memory banks 310 to 313 respectively. A simultaneous access in the logically horizontal direction to pieces of data R [i] [j] is an access made by changing the index j but keeping the index i constant. On the other hand, another typical simultaneous access can be made at the same time in the logically vertical direction to, for example, R [0] [1], R [1] [1], R [2] [1] and R [3] [1] because they are also stored in the second memory bank 311, the third memory bank 312, the fourth memory bank 313 and the first memory bank 310 respectively. A simultaneous access in the logically vertical direction to pieces of data R [i] [j] is an access made by changing the index i but keeping the index j constant.

Figure 9:
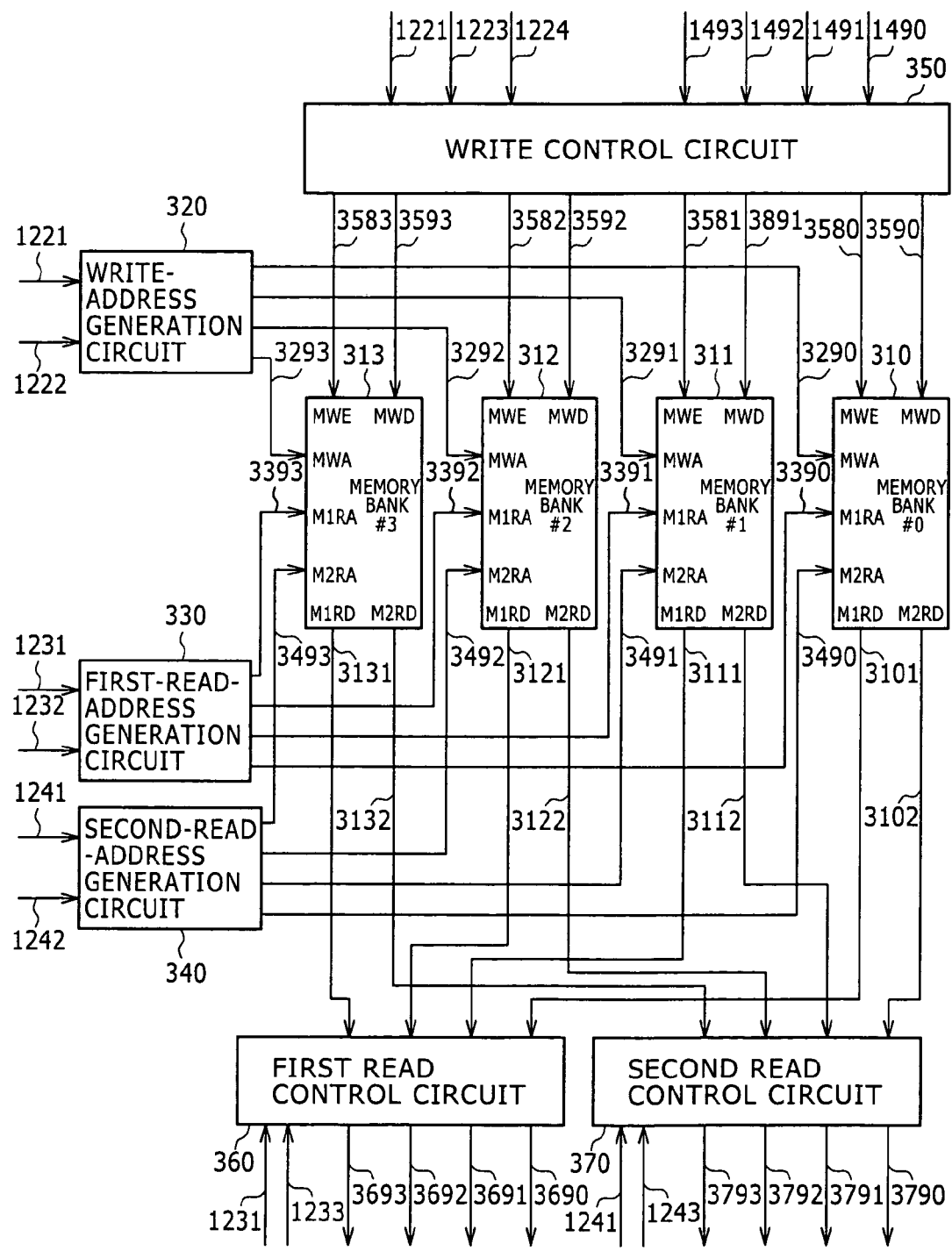
FIG. 9 is a diagram showing a typical physical configuration of the register file according to an embodiment of the present invention.

FIG. 9 is a diagram showing a typical physical configuration of the register file 130 according to the embodiment of the present invention. It is assumed that each simultaneous access to the register file 130 is made to 4 pieces of data. As shown in the figure, the register file 130 thus includes 4 memory banks 310 to 313. As control circuits of the memory banks 310 to 313, the register file 130 also includes a write-address generation circuit 320, a first-read-address generation circuit 330, a second-read-address generation circuit 340, a write control circuit 350, a first read control circuit 360 and a second read control circuit 370.

The memory banks 310 to 313 each have ports operating independently of each other. The ports are ports for a write address MWA, a first read address M1RA, a second read address M2RA, write data MWD, first read data M1RD, second read data M2RD and a write enable signal MWE. When an address is supplied to the port of the first read address M1RA, data stored at the address is output from the port of the first read data M2RD. By the same token, when an address is supplied to the port of the second read address M2RA, data stored at the address is output from the port of the second read data M2RD. When an address is supplied to the port of the write address MWA, on the other hand, data supplied to the port of the write data MWD is stored at the address at the time a write enable signal supplied to the port of the write enable signal MWE is put in an active state.

The write-address generation circuit 320 is a circuit for generating a write address MWA to be supplied to the memory banks 310 to 313. To put in detail, the write-address generation circuit 320 receives a write-register specification 1221 and a write-register scan direction 1222 from the instruction decoder 120, outputting write addresses 3290 to 3293 to the memory banks 310 to 313 respectively.

By the same token, the first-read-address generation circuit 330 is a circuit for generating a first read address M1RA to be supplied to the memory banks 310 to 313. To put in detail, the first-read-address generation circuit 330 receives a first-read-register specification 1231 and a first-read-register scan direction 1232 from the instruction decoder 120, outputting first read addresses 3390 to 3393 to the memory banks 310 to 313 respectively.

By the same token, the second-read-address generation circuit 340 is a circuit for generating a second read address M2RA to be supplied to the memory banks 310 to 313. To put in detail, the second-read-address generation circuit 340 receives a second-read-register specification 1241 and a second-read-register scan direction 1242 from the instruction decoder 120, outputting second read addresses 3490 to 3493 to the memory banks 310 to 313 respectively.

The write control circuit 350 is a circuit for supplying a write enable signal MWE and write data MWD to the memory banks 310 to 313. To put in detail, the write control circuit 350 receives a write-register specification 1221, a write-register displacement 1223 and a write-register element count 1224 from the instruction decoder 120 as well as pieces of write data 1490 to 1493 from the processing unit 140, supplying write enable signals 3580 to 3583 as well as pieces of write data 3590 to 3593 to the memory banks 310 to 313 respectively as shown in FIG. 9.

On the other hand, the first read control circuit 360 is a circuit for controlling destinations of first read data M1RD read out from the memory banks 310 to 313. To put it in detail, the first read control circuit 360 receives a first-read-register specification 1231 and a first-read-register displacement 1233 from the instruction decoder 120 as well as pieces of first read data 3101, 3111, 3121 and 3131 from the memory banks 310 to 313 respectively, supplying pieces of first read data 3690, 3691, 3692 and 3693 to the processing unit 140.

By the same token, the second read control circuit 370 is a circuit for controlling destinations of second read data M2RD read out from the memory banks 310 to 313. To put it in detail, the second read control circuit 370 receives a second-read-register specification 1241 and a second-read-register displacement 1243 from the instruction decoder 120 as well as pieces of second read data 3102, 3112, 3122 and 3132 from the memory banks 310 to 313 respectively, supplying pieces of second read data 3790, 3791, 3792 and 3793 to the processing unit 140.

Figure 10A:
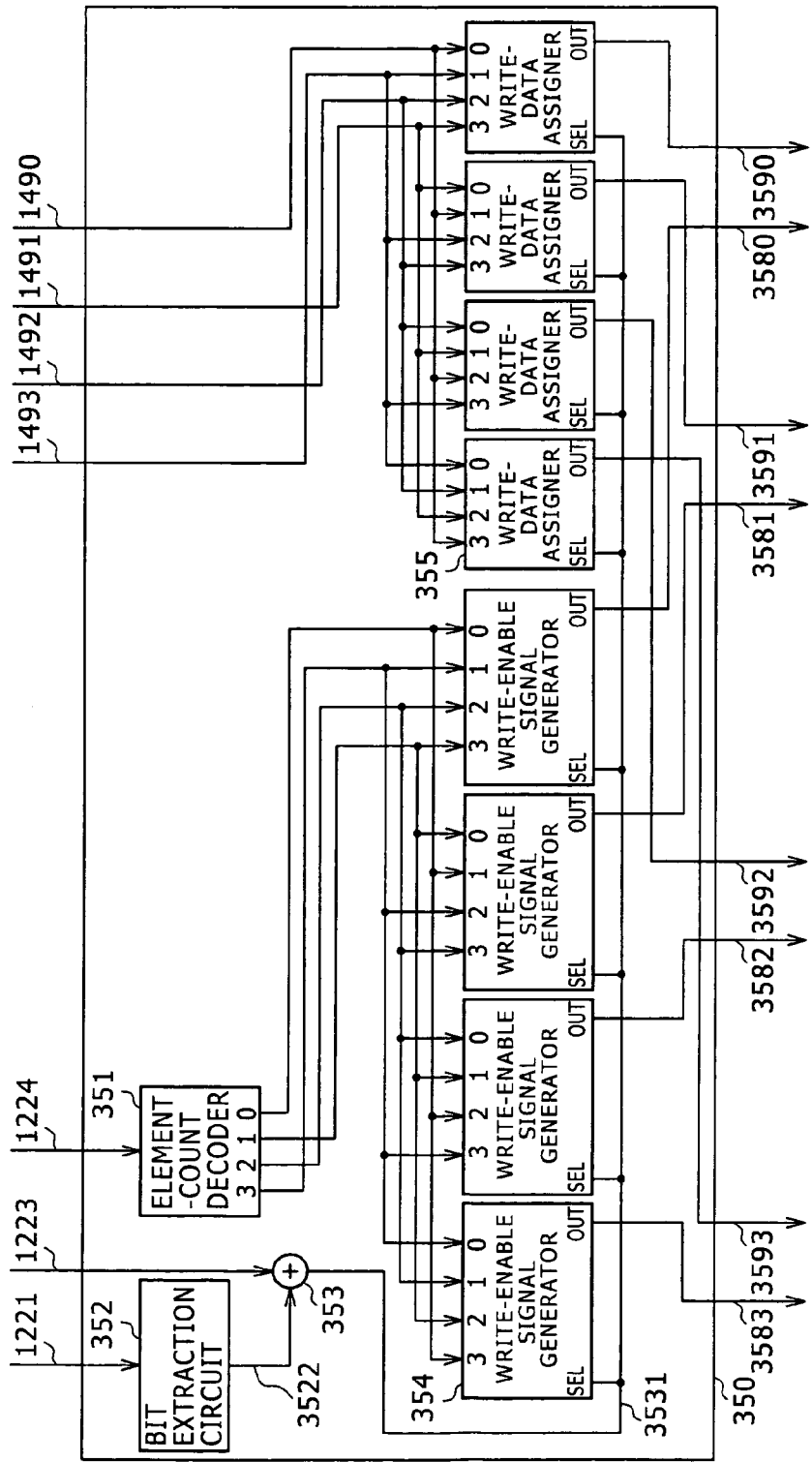

FIGS. 10A and 10B are diagrams showing a typical configuration of the write control circuit 350 according to an embodiment of the present invention. As shown in FIG. 10A, the write control circuit 350 has an element-count decoder 351, a bit extraction circuit 352, an adder 353, 4 write-enable-signal generators 354 and 4 write-data assigners 355.

The bit extraction circuit 352 outputs 2 lower-order bits of the write-register specification 1221, which is received from the instruction decoder 120, as data 3522. As described before, the 2 lower-order bits of the write-register specification 1221 represent the in-matrix row number 212, that is, the number of a row in a matrix as shown in FIG. 4. The adder 353 adds the data 3522 received from the bit extraction circuit 352 to a write-register displacement 1223 received from the instruction decoder 120 to produce a sum represented by a write-register select signal 3531. The write-register select signal 3531 is thus a signal pointing to a write register serving as the start of a write operation.

The element-count decoder 351 decodes the write-register element count 1224 received from the instruction decoder 120, outputting data like that shown in the right column of FIG. 10B. As shown in this figure, write-register element counts 1224 of 0, 1, 2 and 3 show 1, 2, 3 and 4 elements respectively. Thus, the element-count decoder 351 outputs an element count signal requesting a write operation for the corresponding number of elements to the write-enable-signal generators 354.

The 4 write-enable-signal generators 354 supply the write enable signals 3580 to 3583 to the memory banks 310 to 313 respectively in accordance with the aforementioned write-register select signal 3531 as will be described later by referring to FIG. 11. However, only write-enable-signal generators 354 selected by the element count signal received from the element-count decoder 351 actually supply the write enable signals to their respective memory banks, the number of which is determined by the element count signal.

By the same token, the 4 write-data assigners 355 supply the pieces of write data 1490 to 1493 received from the processing unit 140 to the memory banks 310 to 313 as pieces of data 3590 to 3593 respectively in accordance with the aforementioned write-register select signal 3531 as will be described later by referring to FIG. 11. Unlike the write-enable-signal generators 354, however, all the write-data assigners 355 operate without regard to the element count signal received from the element-count decoder 351.

It is to be noted that, stating the above write control in general terms, a write-data select signal MWDsel representing the aforementioned write-register select signal 3531, write data MWD representing the pieces of write data 3590 to 3593 and a write enable signal MWE representing the write enable signals 3580 to 3583 are defined as follows:

$MWDsel\ [b] = pmod\ (b-IX-FS,\ n)$ $MWD\ [b] = WD\ [MWDsel\ [b]]$ $MWE\ [b] = (pmod\ (b-IX-FS,\ n) <= SZ)\ ?\ 1;\ 0$ In the above definitions, symbol IX denotes a write register specification, symbol FS denotes a write register displacement and symbol SZ denotes the number of write register elements. In addition, symbol n denotes the number of memory banks and symbol b denotes the number of a memory bank. Thus, the memory-bank number b is an integer in the range 0 to (n−1). Furthermore, symbol WD represents the pieces of write data 1490 to 1493 data output by the processing unit 140 as data to be eventually written into a memory bank by way of the write-data assigners 355. That is to say, MWD [b], which is data actually written into a memory bank indicated by the memory-bank number b in the range 0 to (n−1), is selected among pieces of write data 1490 to 1493 represented by WD in accordance with MWD-sel [b]. Moreover, symbol pmod (i, j) denotes a function returning a remainder obtained as a result of dividing an integer i by an integer j. In addition, symbol 'a ? x ; y' denotes a function returning x for a=1 or returning y for a=0.

FIG. 11 is a diagram showing how the write-data assigners 355 employed in the write control circuit 350 assign the pieces of write data 1490 to 1493 received from the processing unit 140 to the memory banks 310 to 313 as pieces of data 3590 to 3593 respectively in dependence on the aforementioned write-register select signal 3531, which is the sum of a row number and a write register displacement. As described before, the write-register select signal 3531 is a signal output by the adder 353. The write-register select signal 3531 is supplied to the write-data assigners 355 as a select signal SEL. If the write-register select signal 3531 has a value of 0, for example, the write-data assigners 355 assign the pieces of write data 1490 to 1493 to the memory banks 310 to 313 as pieces of data 3590 to 3593 respectively as they are.

If the write-register select signal 3531 has a value of 1, the write-data assigners 355 assign the pieces of write data 1490, 1491, 1492 and 1493 received from the processing unit 140 to the memory banks 311, 312, 313 and 310 as pieces of data 3591, 3592, 3593 and 3590 respectively. That is to say, the write-data assigners 355 assign the pieces of write data 1490, 1491, 1492 and 1493 to the memory banks 311, 312, 313 and 310 respectively after rotating the pieces of write data 1490, 1491, 1492 and 1493 in a direction of increasing the number of the memory bank by 1, that is, after rotating the pieces of write data 1490, 1491, 1492 and 1493 in the left direction by 1 element over the memory banks 310 to 313 shown in FIG. 9. By the same token, if the write-register select signal 3531 has a value of 2, the write-data assigners 355 assign the pieces of write data 1490, 1491, 1492 and 1493 to the memory banks 312, 313, 310 and 311 as pieces of data 3592, 3593, 3590 and 3591 respectively after rotating the pieces of write data 1490, 1491, 1492 and 1493 in the left direction by 2 elements. In the same way, if the write-register select signal 3531 has a value of 3, the write-data assigners 355 assign the pieces of write data 1490, 1491, 1492 and 1493 to the memory banks 313, 310, 311 and 312 as pieces of data 3593, 3590, 3591 and 3592 respectively after rotating the pieces of write data 1490, 1491, 1492 and 1493 in the left direction by 3 elements.

In the assignments shown in FIG. 11, the write-data assigners 355 are taken as the assigners of data. It is to be noted that, in the same way as the write-data assigners 355, the assignments based on the write-register select signal 3531 can also be applied to the write-enable-signal generators 354, which serve as the generators of the write enable signals as signals output to the memory banks 310 to 313. In the case of the write-enable-signal generators 354, however, only write-enable-signal generators 354 selected by the element-count signal received from the element-count decoder 351 actually supply write enable signals to their respective memory banks, the number of which is determined by the element-count signal.

Figure 12:
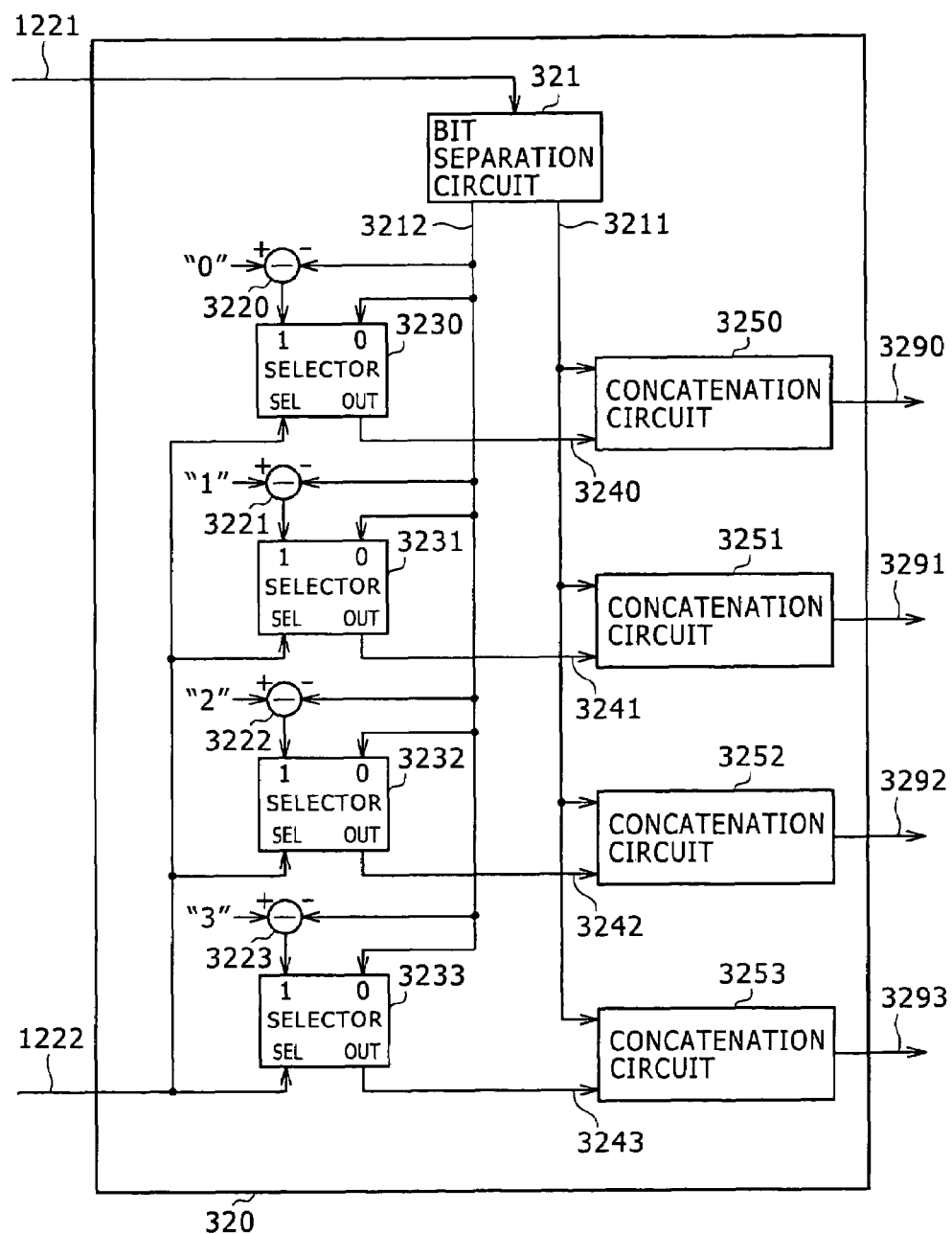
FIG. 12 is a diagram showing a typical configuration of a write-address generation circuit according to an embodiment of the present invention.

FIG. 12 is a diagram showing a typical configuration of the write-address generation circuit 320 according to an embodiment of the present invention. As shown in the figure, the write-address generation circuit 320 has a bit separation circuit 321, subtractors 3220 to 3223, row-number selectors 3230 to 3233 and concatenation circuits 3250 to 3253.

The bit separation circuit 321 splits the write-register specification 1221 received from the instruction decoder 120 into a matrix number 3211 having a length of 2 bits and the in-matrix row number 3212 also having a length of 2 bits as explained earlier by referring to FIG. 4.

The subtractor 3220 subtracts the in-matrix row number 3212 from the constant 0 and supplies the result of the subtraction to the row-number selector 3230. By the same token, the subtractor 3221 subtracts the in-matrix row number 3212 from the constant 1 and supplies the result of the subtraction to the row-number selector 3231. In the same way, the subtractor 3222 subtracts the in-matrix row number 3212 from the constant 2 and supplies the result of the subtraction to the row-number selector 3232. Likewise, the subtractor 3223 subtracts the in-matrix row number 3212 from the constant 3 and supplies the result of the subtraction to the row-number selector 3233. Thus, four numbers incremented from the preceding one by 1 are supplied to inputs 1 of the row-number selectors 3230 to 3233 respectively.

On the other hand, the in-matrix row number 3212 is supplied as it is to inputs 0 of all the row-number selectors 3230 to 3233. The write-register scan direction 1222 output by the instruction decoder 120 is supplied to the row-number selectors 3230 to 3233 as a signal used by each of the row-number selectors 3230 to 3233 to select input 0 or input 1. That is to say, if the write-register scan direction 1222 is 0, row numbers 3240 to 3243 are output by the row-number selectors 3230 to 3233 respectively as numbers different from each other by a difference of 1. If the write-register scan direction 1222 is 1, on the other hand, the row numbers 3240 to 3243 are output by the row-number selectors 3230 to 3233 respectively as numbers equal to each other.

The row numbers 3240 to 3243 output by the row-number selectors 3230 to 3233 respectively are supplied to the concatenation circuits 3250 to 3253 respectively to be concatenated back with the matrix number 3211. The row numbers 3240 to 3243 concatenated with the matrix number 3211 are supplied to the memory banks 310 to 313 respectively as write addresses 3290 to 3293 respectively. That is to say, if the write-register scan direction 1222 output by the instruction decoder 120 is 0, the addresses 3290 to 3293 are supplied to the memory banks 310 to 313 respectively as write addresses for write operations carried out in an access in the horizontal direction of the matrix. If the write-register scan direction 1222 output by the instruction decoder 120 is 1, on the other hand, the addresses 3290 to 3293 are supplied to the memory banks 310 to 313 respectively as write addresses for write operations carried out in an access in the vertical direction of the matrix. Thus, if the write-register scan direction 1222 output by the instruction decoder 120 is 0 indicating that write operations are to be carried out in the horizontal scan direction, the write addresses 3290 to 3293 are supplied to the memory banks 310 to 313 respectively as addresses incremented from the preceding one by 1. If the write-register scan direction 1222 output by the instruction decoder 120 is 1 indicating that write operations are to be carried out in the vertical scan direction of the matrix, on the other hand, the write addresses 3290 to 3293 are supplied to the memory banks 310 to 313 respectively as addresses equal to each other.

A typical configuration of the write-address generation circuit 320 has been explained by referring to FIG. 12. It is to be noted that the first-read-address generation circuit 330 and the second-read-address generation circuit 340 can also be implemented by the same configuration as that of the write-address generation circuit 320.

To describe the above address generation in general terms, a memory address MA [b] representing the write addresses 3290 to 3293, first read address 3390 to 3393 and second read address 3490 to 3493 is defined by the following equation.

$$MA\ [b]=(IX-pmod\ (IX,\ n))+(RXC\ ?\ pmod\ (b-IX,\ n);\ pmod\ (IX,\ n))$$

In the above definition, symbol IX denotes a register specification and symbol RXC denotes the register scan direction. In addition, symbol n denotes the number of memory banks and symbol b denotes the number of a memory bank. Thus, the memory-bank number b is an integer in the range 0 to (n−1). Moreover, symbol pmod (i, j) denotes a function returning a remainder obtained as a result of dividing an integer i by an integer j. In addition, symbol 'a ? x ; y' denotes a function returning x for a=1 or returning y for a=0.

Figure 13:
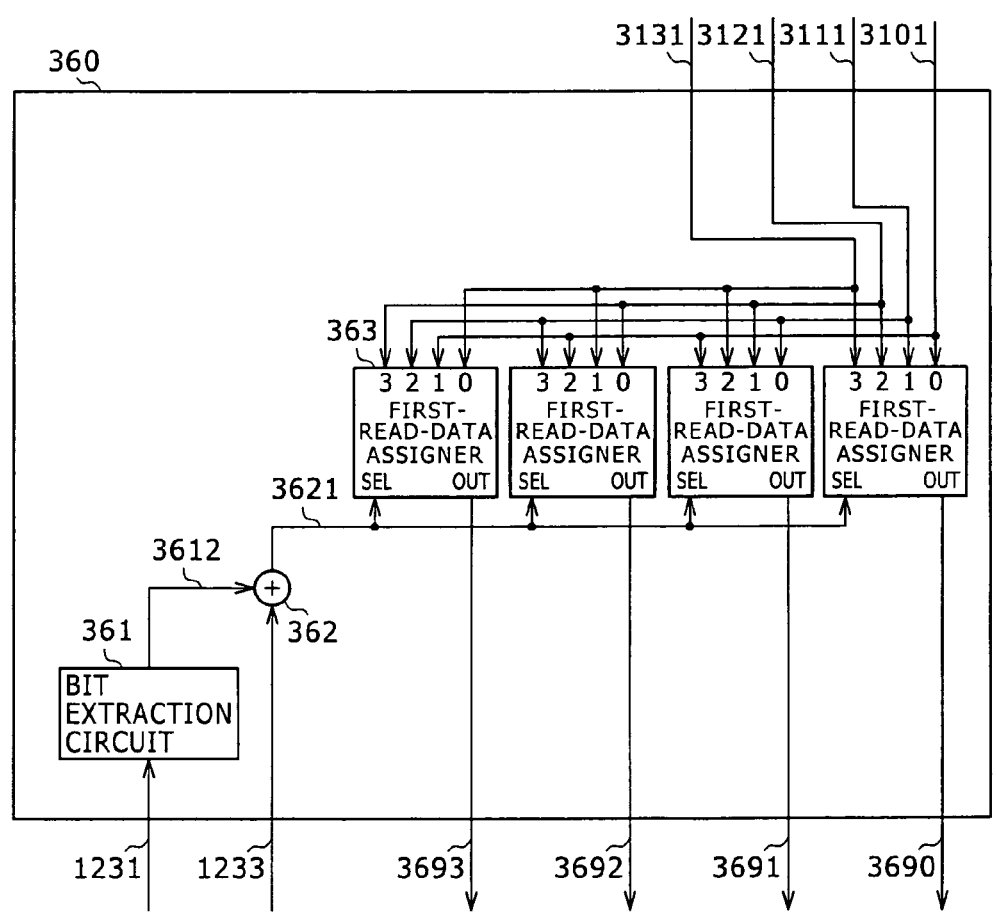
FIG. 13 is a diagram showing a typical configuration of a first read control circuit according to an embodiment of the present invention.

FIG. 13 is a diagram showing a typical configuration of the first read control circuit 360 according to an embodiment of the present invention. As shown in the figure, the first read control circuit 360 comprises a bit extraction circuit 361, an adder 362 and 4 first-read-data assigners 363.

The bit extraction circuit 361 outputs 2 low-order bits of the first-read-register specification 1231 received from the instruction decoder 120 as data 3612. As described before, the 2 low-order bits of the first-read-register specification 1231 represent the in matrix row number 212, that is, the number of a row in a matrix as shown in FIG. 4. The adder 362 adds the data 3612 received from the bit extraction circuit 361 to a first-read-register displacement 1233 received from the instruction decoder 120 to produce a sum represented by a first-read-register select signal 3621. The first-read-register select signal 3621 is a signal pointing to a first read register serving as the start of a first read operation.

The 4 first-read-data assigners 363 receive the pieces of first read data 3101 to 3131 from the memory banks 310 to 313 respectively and outputs the pieces of first read data 3101 to 3131 as pieces of first read data 3690 to 3693 to the processing unit 140 in a way according to the aforementioned first-read-register select signal 3621 as will be described later by referring to FIG. 14. The processing unit 140 uses the pieces of first read data 3690 to 3693 as the first operand.

It is to be noted that, to state the above read control in general terms, a read-data select signal MRDsel representing the aforementioned first-read-register select signal 3621 as well as a second-read-register select signal and read data RD representing the pieces of first read data 3690 to 3693 as well as the pieces of second read data 3790 to 3793 are defined by the following equations:

$$MRDsel\ [b]=pmod\ (b-IX-FS,\ n)$$

$$RD\ [MRDsel\ [b]]=MRD\ [b]$$

In the above definitions, symbol IX denotes a register specification and symbol FS denotes a register displacement. In addition, symbol n denotes the number of memory banks and symbol b denotes the number of a memory bank. Thus, the memory-bank number b is an integer in the range 0 to (n−1). Furthermore, symbol MOD [b] representing the pieces of first read data 3101 to 3131 and the pieces of second read data 3102 to 3132 is data actually read out from a memory bank indicated by the memory-bank number b in the range 0 to (n−1). Moreover, symbol pmod (i, j) denotes a function returning a remainder obtained as a result of dividing an integer i by an integer j.

FIG. 14 is a diagram showing how the first-read-data assigners 363 employed in the first read control circuit 360 designate the pieces of first read data 3101 to 3131 actually read out from the memory banks 310 to 313 respectively as the pieces of first read data 3690 to 3693 supplied to the processing unit 140 in dependence on the aforementioned first-read-register select signal 3621, which is a sum of a row number and a register displacement. As described before, the first-read-register select signal 3621 is a signal output by the adder 363. The first-read-register select signal 3621 is supplied to the first-read-data assigners 363 as a select signal SEL. If the first-read-register select signal 3621 has a value of 0, for example, the first-read-data assigners 363 designate the pieces of first read data 3101, 3111, 3121 and 3131 as the pieces of first read data 3690 to 3693 respectively as they are.

If the first-read-register select signal 3621 has a value of 1, the first-read-data assigners 363 designate the pieces of first read data 3101, 3111, 3121 and 3131 as the pieces of first read data 3693, 3690, 3691 and 3692 respectively. That is to say, the first-read-data assigners 363 designate the pieces of first read data 3101, 3111, 3121 and 3131 as the pieces of first read data 3693, 3690, 3691 and 3692 respectively after rotating the pieces of first read data 3101 to 3131 in a direction of decreasing the number of the memory bank by 1, that is, after rotating the pieces of first read data 3101, 3111, 3121 and 3131 in the right direction by 1 element over the memory banks 310 to 313 shown in FIG. 9. By the same token, if the first-read-register select signal 3621 has a value of 2, the first-read-data assigners 363 designate the pieces of first read data 3101, 3111, 3121 and 3131 as the pieces of first read data 3692, 3693, 3690 and 3691 respectively after rotating the pieces of first read data 3101, 3111, 3121 and 3131 in the right direction by 2 elements. In the same way, if the first-read-register select signal 3621 has a value of 3, the first-read-data assigners 363 designate the pieces of first read data 3101, 3111, 3121 and 3131 as the pieces of first read data 3691, 3692, 3693 and 3690 respectively after rotating the pieces of first read data 3101, 3111, 3121 and 3131 in the right direction by 3 elements.

The typical configuration of the first read control circuit 360 has been explained by referring to FIGS. 13 and 14. It is to be noted, however, that the second read control circuit 370 for outputting the pieces of second read data 3790 to 3793 has the same configuration as the first read control circuit 360.

Figure 15:
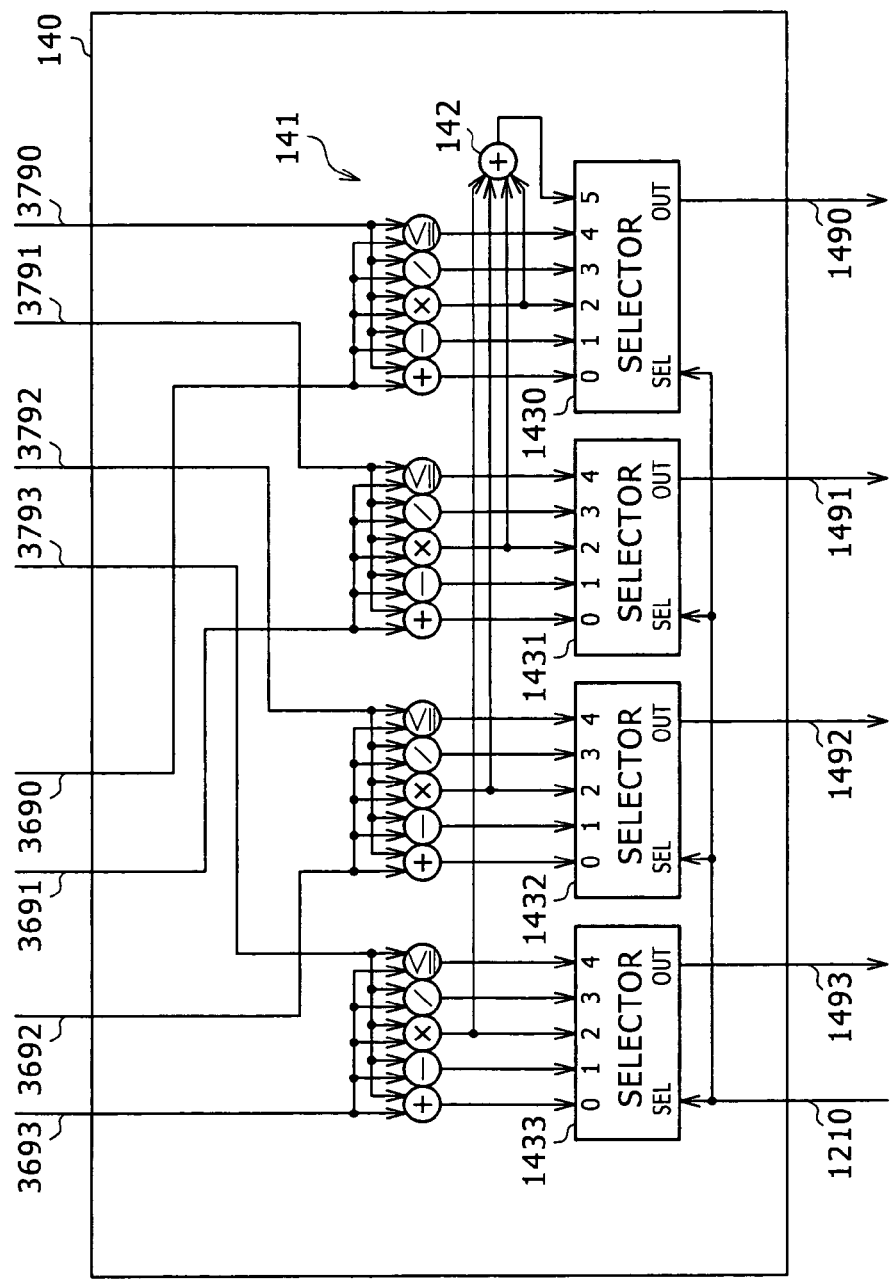
FIG. 15 is a diagram showing a typical configuration of a processing unit according to an embodiment of the present invention.

FIG. 15 is a diagram showing a typical configuration of the processing unit 140 according to an embodiment of the present invention. As shown in the figure, the processing unit 140 has 4 arithmetic-circuit groups 141 each having arithmetic circuits, an adder 142 and processing-result selectors 1430 to 1433.

The 4 arithmetic-circuit groups 141 are each designed for a pair of input operands. The arithmetic-circuit groups 141 each include typically an adder, a subtractor, a multiplier, a divider and a comparator. The adder 142 is a circuit for summing products output by the multipliers employed in the arithmetic-circuit groups 141. That is to say, the output of the adder 142 is a sum of products obtained in a computation of an inner product of matrices.

The processing-result selectors 1430 to 1433 are each a component for selecting one of processing results output by the arithmetic-circuit groups 141 and the adder 142 in accordance with the function code 1210 received from the instruction decoder 120. Processing results selected by the processing-result selectors 1430 to 1433 are output to the memory banks 310 to 313 as the pieces of write data 1490 to 1493. If the function code 1210 received from the instruction decoder 120 is 0, for example, the processing-result selectors 1430 to 1433 select addition results output by the arithmetic-circuit groups 141. If the function code 1210 received from the instruction decoder 120 is 1, the processing-result selectors 1430 to 1433 select subtraction results output by the arithmetic-circuit groups 141. If the function code 1210 received from the instruction decoder 120 is 2, the processing-result selectors 1430 to 1433 select multiplication results output by the arithmetic-circuit groups 141. If the function code 1210 received from the instruction decoder 120 is 3, the processing-result selectors 1430 to 1433 select division results output by the arithmetic-circuit groups 141. If the function code 1210 received from the instruction decoder 120 is 4, the processing-result selectors 1430 to 1433 select comparison results output by the arithmetic-circuit groups 141. Then, the processing-result selectors 1430 to 1433 output the selected addition results to the memory banks 310 to 313 as the pieces of write data 1490 to 1493.

In addition, if the function code 1210 received from the instruction decoder 120 is 5, on the other hand, the processing-result selector 1430 selects a product sum output by the adder 142 and the outputs of the other processing selectors 1431 to 1433 are made invalid. If the function code 1210 received from the instruction decoder 120 is 5, only the write data 1490 is utilized. Thus, the other pieces of write data 1491 to 1493 are each less-important information, which is ignored.

As an example, an inner-product operation instruction XDOT for the SIMD processor 100 according to an embodiment of the present invention is typically specified as follows:

XDOT d_ix, d_fs, a_ix, a_rxc, b_ix, b_rxc

The XDOT instruction is an instruction for finding an inner product of typically a row of a matrix A and typically a column of a matrix B as well as storing the inner product in an element of a matrix D. In the XDOT instruction, symbol d_ix denotes a register specification for the matrix D and symbol d_fs denotes a displacement in the matrix D. Thus, the operands d_ix and d_fs specify an element of the matrix D as a matrix element in which the inner product is to be stored. On the other hand, symbol a_ix denotes a register specification for the matrix A and symbol a_rxc denotes the direction of scanning over the matrix A. Typically, the operand a_rxc is set at 0 corresponding to a row. Thus, the operands a_ix and a_rxc specify a row in the matrix A. By the same token, symbol b_ix denotes a register specification for the matrix B and symbol b_rxc denotes the direction of scanning over the matrix B. Typically, the operand b_rxc is set at 1 corresponding to a column. Thus, the operands b_ix and b_rxc specify a column in the matrix B.

For 4-row 4-column matrixes, concrete operations of the XDOT instruction are defined as follows:

$$R\ [d\_ix]\ [d\_fs] = ((a\_rxc\ ?\ R\ [a\_ix-(a\_ix\ \%4)+0]\ [a\_ix\ \%4];\ R\ [a\_ix]\ [0]) \times (b\_rxc\ ?\ R\ [b\_ix-(b\_ix\ \%4)+0]\ [b\_ix\ \%4];\ R[b\_ix]\ [0])) +$$
$$((a\_rxc\ ?\ R\ [a\_ix-(a\_ix\ \%4)+1]\ [a\_ix\ \%4];\ R\ [a\_ix]\ [1]) \times (b\_rxc\ ?\ R\ [b\_ix-(b\_ix\ \%4)+1]\ [b\_ix\ \%4];\ R\ [b\_ix]\ [1])) + ((a\_rxc\ ?\ R\ [a\_ix-(a\_ix\ \%4)+2]\ [a\_ix\ \%4];\ R\ [a\_ix]\ [2]) \times (b\_rxc\ ?\ R\ [b\_ix-(b\_ix\ \%4)+2]\ [b\_ix\ \%4];\ R\ [b\_ix]\ [2])) + ((a\_rxc\ ?\ R\ [a\_ix-(a\_ix\ \%4)+3]$$
$$[a\_ix\ \%4];\ R\ [a\_ix]\ [3]) \times (b\_rxc\ ?\ R\ [b\_ix-(b\_ix\ \%4)+3]\ [b\_ix\ \%4];\ R\ [b\_ix]\ [3]))$$

In the above definition, symbol 'a ? x ; y' denotes a function returning x for a=1 or returning y for a=0. In addition, symbol m % n denotes a function returning a remainder obtained as a result of dividing an integer m by an integer n.

By specifying a_rxc=0 a horizontal direction and b_rxc=1 indicating a vertical direction in the XDOT instruction, a result of an inner-product operation carried out on any arbitrary row specified by a_ix as a row of the matrix A and any arbitrary column specified by b_ix as a column of the matrix B can be stored at a predetermined position specified by d_ix and d_fs as an element position in the matrix D.

As an example, assume an instruction of XDOT 8, 2, 0, 0, 6, 1. In this case, the instruction decoder 120 outputs a function code 1210 of 5 representing an inner-product operation, a write-register specification 1221 of 8, a write-register displacement 1223 of 2 a first-read-register specification 1231 of 0, a first-read-register scan direction 1232 of 0, a second-read-register specification 1241 of 6 and a second-read-register scan direction 1242 of 1, as a result of decoding. The write-register specification 1221 of 8 and the write-register displacement 1223 of 2 specify the matrix element D [0, 2] in the matrix D. On the other hand, the first-read-register specification 1231 of 0 and the first-read-register scan direction 1232 of 0 specify row #0 in the matrix A. By the same token, the second-read-register specification 1241 of 6 and the second-read-register scan direction 1242 of 1 specify a column of the matrix B. Since the write-register displacement 1223 is set at 2, the specified column of the matrix B is column #2 for this XDOT instruction. In addition, since the inner-product operation is carried out the on 4-row 4-column matrices A and B, as default values for the XDOT instruction, the instruction decoder 120 also outputs a first-read-register element count 1234 of 3 corresponding to 4 elements and a second-read-register element count 1244 of 3 corresponding to 4 elements. Moreover, the instruction decoder 120 also outputs a first-read-register displacement 1233 of 0 and a second-read-register displacement 1243 of 0 also as default values for the XDOT instruction. Furthermore, since the result of the inner-product operation is a scalar value, the instruction decoder 120 also outputs a write-register element count 1224 of 0 corresponding to a single value and a write-register scan direction 1222 of 0.

The write-address generation circuit 320 generates write addresses 3290 to 3293 all set at 8 corresponding to row #0 included in the matrix D as a row including the matrix element D [0, 2] cited above. The first-read-address generation circuit 330 generates first read addresses 3390 to 3393 of 0 corresponding to aforementioned row #0 in the matrix A. The second-read-address generation circuit 340 generates a second read address 3490 of 6, a second read address 3491 of 7, a second read address 3492 of 4 and a second read address 3493 of 5. The start second read address 3490 of 6 is computed from the second-read-register specification 1241 of 6, which includes a matrix number of 1 indicating the matrix B and an in-matrix row number of 2 in the matrix B.

The first read control circuit 360 designates the pieces of first read data 3101 to 3131 as the pieces of first read data 3690 to 3693 respectively as they are as explained earlier by referring to FIG. 14 because the first-read-register specification 1231 is set at 0 and the first-read-register displacement 1233 is set at 0 to give a first-read-register select signal 3621 of 0. On the other hand, the second read control circuit 370 rotates the pieces of second read data 3102 to 3132 in the right direction by 2 elements also as explained earlier by referring to FIG. 14 because the second-read-register specification 1241 is set at 6 and second first-read-register displacement 1243 is set 0 to give a second-read-register select signal of 2, and designate the second read data 3102 as the second read data 3792, the second read data 3112 as the second read data 3793, the second read data 3122 as the second read data 3790 and the second read data 3132 as the second read data 3791.

In accordance with the function code 1210, the processing unit 140 multiplies the pieces of first read data 3690 to 3693 by the pieces of second read data 3790 to 3793 respectively, sums the products each obtained as a result of the multiplication and outputs the sum as the write data 1490.

The write control circuit 350 rotates the pieces of write data 1490, 1491, 1492 and 1493 received from the processing unit 140 in the left direction by 2 elements as explained earlier by referring to FIG. 11 because the write-register specification 1221 is set at 8 and the write-register displacement 1223 is set at 2 to give a write-register select signal 3531 of 2. Then, the write control circuit 350 outputs the rotated write data 1490 as the write data 3592, the rotated write data 1491 as the write data 3593, the rotated write data 1492 as the write data 3590 and the rotated write data 1493 as the write data 3591 as shown in FIG. 11. However, since the write-register-element count 1224 is set at 0 indicating an element count of 1 and the write-register displacement 1223 is set 2 as described above, the write control circuit 350 activates only the write enable signal 3582 and deactivates the other write enable signals 3580, 3581 and 3583. Thus, only the memory bank 312 corresponding to row #2 is enabled.

Accordingly, the register file 130 reads out the pieces of first read data from row #0 indicated by the first-read-register specification 1231 of 0 as a row of the matrix A in the register file 130. The pieces of first read data from row #0 are R [0] [0], R [0] [1], R [0] [2] and R [0] [3]. The register file 130 also reads out the pieces of second read data from aforementioned column #2 as a row of the matrix B in the register file 130. The pieces of second read data from column #2 are R [4] [2], R [5] [2], R [6] [2] and R [7] [2], which are read out from the address of 4 in memory bank #2, the address of 5 in memory bank #3, the address of 6 in memory bank #0 and the address of 7 in memory bank #1 respectively as shown in FIG. 8 at the same time. Then, the processing unit 140 computes the following sum of products: R [0] [0]×R [4] [2]+R [0] [1]×R [5] [2]+R [0] [2]×R [6] [2]+R [0] [3]×R [7] [2]. Finally, the processing unit 140 stores the computed sum of products in the matrix element D [0] [2] cited above as an element of the matrix D. The matrix element D [0] [2] is R [8] [2] of the register file 130.

In order to obtain the values of the 16 elements of the matrix D as an inner product of the 4-row 4-column matrices A and B, a program including the following 16 XDOT instructions is executed.

XDOT 8, 0, 0, 0, 4, 1
XDOT 8, 1, 0, 0, 5, 1
XDOT 8, 2, 0, 0, 6, 1
XDOT 8, 3, 0, 0, 7, 1
XDOT 9, 0, 1, 0, 4, 1
XDOT 9, 1, 1, 0, 5, 1
XDOT 9, 2, 1, 0, 6, 1
XDOT 9, 3, 1, 0, 7, 1
XDOT 10, 0, 2, 0, 4, 1
XDOT 10, 1, 2, 0, 5, 1
XDOT 10, 2, 2, 0, 6, 1
XDOT 10, 3, 2, 0, 7, 1
XDOT 11, 0, 3, 0, 4, 1
XDOT 11, 1, 3, 0, 5, 1
XDOT 11, 2, 3, 0, 6, 1
XDOT 11, 3, 3, 0, 7, 1

As described above, in accordance with the SIMD processor 100 according to an embodiment of the present invention, by executing a program including the above 16 XDOT instructions, it is possible to obtain the values of the 16 elements of the matrix D as an inner product of the 4-row 4-column matrices A and B. In comparison with the related-art technology requiring 36 instructions, the number of instructions is reduced to a value smaller than half the original number.

As described above, in accordance with an embodiment of the present invention, the first read control circuit 360 and the second read control circuit 370 rearrange pieces of data read out from the memory banks 310 to 313, whereas the write control circuit 350 rearranges pieces of write data 1490 to 1493 produced by the processing unit 140 as results of operation. Thus, data arrangement instructions are not required prior to operation instructions.

The embodiments the present invention are each no more than a typical implementation of the present invention. In addition, the embodiments each correspond to an invention-identifying item described in a range of patent claims to be shown later. It is to be noted, however, that the scope of the present invention is by no means limited to the embodiments. That is to say, it is possible to make a variety of changes to the embodiments as long as the changes are within a range not deviating from essentials of the present invention.

In other words, it should be understood by those skilled in the art that various modifications, combinations, sub-combinations and alterations may occur in dependence on design requirements and other factors insofar they are within the scope of the appended claims of equivalents thereof.

The present invention may be applied to an application of carrying out operations in the processor on a plurality of pieces of data at the same time.

What is claimed is:

1. A processor comprising:
a plurality of memory banks in which first to third matrices are dispersedly arranged;
a readout-address generation circuit supplying a first readout address for reading out a predetermined row in the first matrix from the plurality of memory banks and a second readout address for reading out a predetermined column in the second matrix from the plurality of memory banks on the basis of a readout-register designation and a readout-register scan direction of the first and the second matrices;
a readout control circuit controlling arrangement of the predetermined row in the first matrix and the predetermined column in the second matrix, both of which are read out from the plurality of memory banks, in accordance with the first and the second readout addresses on the basis of the readout-register designation and a readout-register displacement of the first and the second matrices;
a processing unit performing inner product processing for the predetermined row in the first matrix and predetermined column in the second matrix which are subjected to the arrangement controlled by the readout control circuit;

a write-address generation circuit supplying a write address in the plurality of memory banks on the basis of a write-register designation and a write-register displacement of the third matrix; and a write control circuit writing the inner product processing's results output by said processing unit in an address corresponding to the third matrix in the plurality of memory banks on the basis of said write-register designation and the write-register displacement.

2. A processor comprising:

an instruction decoder decoding an instruction included in a program ordering results gained by performing inner product processing for a predetermined row in a first matrix and a predetermined column in a second matrix to be written in predetermined elements in a third matrix;

a plurality of memory banks in which the first to third matrices are dispersedly arranged;

a readout-address generation circuit supplying a first readout-address for reading out the predetermined row in the first matrix from the plurality of memory banks and a second readout-address for reading out the predetermined column in the second matrix from the plurality of memory banks, on the basis of a read-register designation and a read-register scan direction of the first and the second matrix decoded by the instruction decoder;

a readout control circuit controlling arrangement of the predetermined row in the first matrix and the predetermined column in the second matrix, both of which are read out from the plurality of memory banks, in accordance with the first and the second readout-addresses, on the basis of the read-register designation and a read-register displacement of the first and the second matrices decoded by the instruction decoder;

a processing unit performing inner product processing for the predetermined row in the first matrix and the predetermined column in the second matrix, which are subjected to the arrangements controlled by the readout control circuit;

a write-address generation circuit supplying a write address in the plurality of memory banks on the basis of a write-register designation and a write-register displacement of the third matrix decoded by the instruction decoder; and a write control circuit writing the inner product processing's results outputted from the processing unit in an address corresponding to the third matrix in the plurality of memory banks on the basis of said write-register designation, and the write-register displacement decoded by the instruction decoder.

* * * * *